Patented June 3, 1941

2,244,521

UNITED STATES PATENT OFFICE 2,244,521

HYDROCARBON OIL REFINING

Seymour W. Ferris, Aldan, and Edwin R. Birkhimer, Philadelphia, Pa., assignors to The Atlantic Refining Company, Philadelphia, Pa., a corporation of Pennsylvania No Drawing. Application August 23, 1935, Serial No. 37,504

5 Claims. (Cl. 196—13)

Our invention relates to the art of refining mineral oil, and more particularly to the separation of mineral oils, such as petroleum oils, into fractions of varying degrees of paraffinicity by means of selective solvents. This application is in part a continuation of our application Serial No. 748,690, filed October 17, 1934, which application Serial No. 748,690 issued on March 1, 1938 as Patent No. 2,109,476.

In accordance with the present invention a mixture of mineral oil and a selective solvent is treated with a secondary or wash solvent to effect separation of the oil-solvent mixture into fractions. By varying the conditions under which the wash solvent is applied, we may obtain the separation from the oil-solvent mixture of a portion of the oil which will have a higher degree of paraffinicity than the original oil in the mixture, or we may obtain substantially complete separation of the initial solvent from the oil, the former being dissolved to large extent in the secondary solvent.

One of the recent developments in the art of refining mineral oils, particularly petroleum, is treatment with a selective solvent such as nitrobenzene, phenol, furfural, benzaldehyde, etc. either alone or in admixture with other solvents, under such condititons that the more naphthenic portion of the oil is dissolved in the selective solvent while the more paraffinic portion thereof remains substantially insoluble in the solvent, and, as a result, there are formed at least two liquid phases of varying degrees of paraffinicity which are then separated one from the other.

The paraffinic oils obtained in this manner are superior lubricants in that they have high resistivity against oxidation, a relatively low carbon residue, and a relatively low susceptibility to change of viscosity with change of temperature.

A useful index of the paraffinicity of petroleum oils is the viscosity-gravity constant, which correlates the relationship between the viscosity (Saybolt Universal) and specific gravity of any viscous oil, and expresses that relationship numerically, for example, .810 for a typical oil from Pennsylvania crude and .900 for a typical oil from Gulf coast crude. A reduction in the viscosity-gravity constant of an oil indicates an increase in the paraffinicity thereof, and an increase in the constant indicates an increase in naphthenicity. The derivation of the constant is described in an article entitled "The Viscosity-Gravity Constant of Petroleum Lubricating Oils" by J. B. Hill and H. B. Coats, Industrial and Engineering Chemistry, vol. 20, p. 641 (1928).

It is to be understood that when the paraffinicity or naphthenicity or the viscosity-gravity constant of an oil is mentioned herein, we refer to such characteristic of the oil after removal of the solvent therefrom.

In carrying out selective solvent refining, the solvent may be applied in a single stage batch process, a multi-stage batch counter-current or a continuous countercurrent system. The separation of the solvent from the resultant oils is generally effected by distillation, and in the case of certain solvents, at sub-atmospheric pressure in order to reduce the distilling temperature and thus prevent possible darkening of the color of the oil by reaction between it and the solvent at the high temperature which would be necessary to vaporize the latter at atmospheric pressure.

We have found that selective solvents may be removed from the oil fractions by methods other than distillation, particularly by subjecting the mixture of oil and solvent to treatment with a secondary or wash solvent, whereby the selective solvent is dissolved in the secondary or wash solvent to the exclusion of the major part of the oil, which is obtained as a separate fraction relatively free from selective solvent. A particularly high degree of freedom from selective solvent is obtained when the treatment with the wash solvent is carried out in a multi-stage or continuous countercurrent process.

By varying the conditions of treatment with the wash solvent, we may cause separation of but a portion of the oil present in the selective solvent, which portion will be found to be more paraffinic than the portion still remaining in solution. The step of obtaining separation of a paraffinic fraction from the oil-solvent mixture is applied more generally to the extract phase resulting from the original treatment, than it is to the raffinate phase of high paraffinicity, since the wash solvents, as a class, are of low solvent power and consequently, except under extreme temperature conditions, would effect but a minor change in the quality of the raffinate. However, we have found that, in certain instances, our process may be used to advantage to effect separation of the raffinate phase into components.

In utilizing our process for the separation of the selective solvent from the treated oil, it is necessary to remove the residual wash solvent from the oil. This separation may be effected by distillation, and it is generally desirable that the wash solvent have a boiling point sufficiently below that of the more volatile fractions of the oil under treatment to permit separation in this manner. It is further desirable that the wash solvent be one which is stable at the temperature of distillation, in the presence of the hydrocarbon oil associated with it. We prefer to use low boiling organic solvents. Examples of suitable secondary or wash solvents are low boiling aliphatic monohydric alcohols such as methyl and ethyl alcohol, derivatives of alcohols such as diethylene glycol mono-ethyl ether, ketones such as acetone, low boiling organic acids such as acetic acid, and the like. Wash solvents used by us are miscible with the selective solvent; also the wash solvents have lower solvent power for oils than the selective solvent has therefor.

In carrying out extraction of oil with a selective solvent, for example, in a continuous countercurrent system, there is obtained from the raffinate outlet of the system, the more paraffinic portion of the oil admixed with a minor portion of selective solvent; for example, when nitrobenzene is used as the solvent it may constitute of the order of 15% of the raffinate phase. From the extract outlet of the system there is obtained the major portion of the solvent, which, for example, when nitrobenzene has been employed, may contain of the order of from 20 to 40%, or more, of oil. Both the raffinate and the extract produced by such an extraction process are substantially saturated at the particular temperature of separation, i. e., the oil in the raffinate is saturated with solvent, and the solvent in the extract is saturated with oil. If, without changing the temperature of the raffinate, there be added a wash solvent of the type contemplated by our invention, for example, methanol, which is practically insoluble in oil and is miscible with the selective solvent, a separate layer is formed, which is to a large extent mixed solvent; as the quantity of wash solvent is increased the extent of separation of solvent from oil becomes greater, until substantially solvent-free oil is obtained. Similarly, if wash solvent be added to the extract it has a salting out effect on the oil contained in the extract, and again a two layer system is formed, one layer of which is predominantly oil and the other predominantly selective solvent and wash solvent. The amount of separation is also dependent upon the temperature of the mixture. A lower temperature will cause more separation of oil, while raising the temperature may offset at least in part, the addition of the wash solvent. Thus, by regulating the quantity of secondary solvent added and the temperature at which the treatment is carried out, we may control the characteristics of the oil which is separated from the mixture.

When the mixture being treated comprises relatively paraffinic oil, the addition of wash solvent is usually for the purpose of separating the selective solvent, and the addition of a relatively large proportion of wash solvent has been found by us to be desirable. On the other hand, when the mixture is an extract comprising the naphthenic portion of the oil, the addition of secondary solvent may effect substantially complete separation from the oil of both the selective and the secondary solvents; or may effect the separation of a fraction, the paraffinicity of which is intermediate between that of the paraffinic fraction obtained by the initial selective solvent extraction and that of the naphthenic fraction resulting from said initial extraction; for the latter type of separation, a smaller quantity of wash solvent is required.

Having added a small quantity of solvent to effect separation of an oil of intermediate paraffinicity, and having separated such oil from the phase containing the larger portion of the solvents, more wash solvent may be added to effect substantially complete separation of the selective solvent from the residual extract.

For purposes of illustration, our invention will now be described with particular reference to the separation of nitrobenzene from the raffinate or paraffinic fraction resulting from extracting a residuum, obtained in redistilling a dewaxed lubricating oil distillate, with nitrobenzene. Such raffinate contained 13.5% by volume of nitrobenzene. This oil-nitrobenzene mixture was treated at 25° C. with 95% methyl alcohol in a 3-stage batch countercurrent system. The volume of methyl alcohol used was about 1820% based on the nitrobenzene present, or 250% based on the raffinate. The products of this treatment were two fractions, one a relatively solvent-free raffinate oil and the other a mixture of selective and wash solvents containing some oil. The oil fraction as removed from the system, was found to contain 0.4% nitrobenzene and 1.6% methyl alcohol by volume, while the solvent fraction as removed from the system, contained 0.9% oil, 4.8% nitrobenzene and 94.3% methyl alcohol by volume. The oil fraction was then subjected to distillation for the removal of methyl alcohol and nitrobenzene, the former being separated at atmospheric pressure while the latter was removed by stripping with the aid of steam. Oil to the extent of 98% of the oil originally present in the raffinate, was recovered from the oil fraction at subatmospheric pressure of about 15 mm. absolute pressure.

Thus it will be seen that by our process it is possible to remove substantially all of the selective solvent from the oil fraction by means of a wash solvent. Methyl alcohol has practically no solvent power for hydrocarbon oils, particularly those in the lubricating oil range. Having a relatively low boiling point, it is, therefore, particularly suitable for purposes of our invention, since it may readily be separated from most selective solvents, particularly nitrobenzene, and from oil, by distillation. By reason of the large volume of methyl alcohol used practically all of the oil is salted out of the oil-solvent mixture. The solvent fraction resulting from this treatment may then be subjected to distillation or other treatment for the separation of the wash solvent from the selective solvent. The selective solvent may be returned to the system for reuse either after separation of the residual oil or while such residual oil is still associated therewith.

The second aspect of our invention, namely, the separation of a fraction of intermediate paraffinicity from the extract phase is illustrated by the following example. The extract obtained in the preparation of the raffinate used as starting material in the previous example, was subjected to treatment at 0° C., in a 3-stage batch countercurrent system, with 150% of methyl alcohol by volume based on the nitrobenzene content of the mixture, or 106% based on the extract. There were obtained two fractions, one predominantly oil, the other predominantly solvent. The oil fraction contained 83.1% oil, 15.7% nitrobenzene, and 1.2% methyl alcohol by volume. The oil in this fraction represented 76.6% of the total oil in the extract entering the system. In the solvent fraction 4.1% oil, 37.7% nitrobenzene and 58.2% methyl alcohol were present, said oil representing 23.4% of the total oil in the extract entering the system. The viscosity-gravity constant of the oil present in the charge to the separation system was .905, that of the oil in the predominantly oil layer resulting from the methanol treatment was .880, while the viscosity-gravity constant of the oil in the predominantly solvent fraction was .948. Thus it will be seen that a yield of 76.6% of oil having a lower viscosity-gravity constant (and hence, more paraffinic) that that of the original oil in the extract, was obtained by this treatment. The separation of the solvent from the oil in the two fractions was effected by distillation.

By increasing the temperature of extraction with the wash solvent, and increasing the quantity of methyl alcohol used over that described in the immediately preceding example, we obtained a combination of the results of the first and second example, that is, the production of an oil of intermediate paraffinicity which was substantially free from nitrobenzene. In carrying out this operation an extract having the same properties as those of the extract used in the immediately preceding example, was subjected to treatment at 25° C. in a 3-stage batch countercurrent system, with 355% methyl alcohol based on the content of nitrobenzene in the extract, or 250% by volume of the extract. The oil fraction thus produced contained 0.2% nitrobenzene, 0.8% methyl alcohol and 99% oil, by volume. After separation of the two solvents by distillation the resulting oil, which represented 55.7% of the total oil charged to the separation system, had a viscosity-gravity constant of 0.865, which is appreciably lower than that of the oil in the charge to the system which, as stated above, was .905.

Thus it will be seen that by controlling the conditions of temperature and quantity of wash solvent, we are able to regulate the type of separation effected. The operation can be made primarily one of selective solvent removal; or of separation of a portion of the oil in the mixture, which portion is of greater paraffinicity than the total oil; or we may adjust conditions to effect both the solvent separation and the separation of an improved oil.

Using acetic acid as wash solvent for the separation of an extract resulting from treating oil with nitrobenzene, it was found that beginning with 75% by volume based on the extract, increasingly larger oil fractions were separated as the volume of the acetic acid was increased. When 150% acetic acid by volume was added to the extract, a layer separated which corresponded to about 60% of the oil in the extract.

Ethyl alcohol was also found to be effective when used in the above described process, but for the same separation, larger quantities of that alcohol were required than when methyl alcohol was employed.

We claim:
1. The process of refining mineral oils which comprises extracting the oil with nitrobenzene, forming a raffinate phase and an extract phase each of which contains nitrobenzene, separating the phases, effecting contact between one phase and an organic wash solvent characterized by its substantially complete miscibility with nitrobenzene and its lower solvent power for oil than that of nitrobenzene for oil thereby forming a phase predominantly oil and a phase predominantly solvent, and separating the oil phase from the solvent phase.

2. The process of refining mineral oils which comprises extracting the oil with nitrobenzene, forming a raffinate phase and an extract phase each of which contains nitrobenzene, separating the phases, effecting contact between one phase and a low boiling alcohol thereby forming a phase predominantly oil and a phase predominantly solvent, and separating the oil phase from the solvent phase.

3. The process of refining mineral oils, which comprises extracting the oil with furfural, forming a raffinate phase and an extract phase, each of which contains furfural, separating the phases, effecting contact between one phase and an organic wash solvent characterized by its substantially complete miscibility with furfural and its lower solvent power for oil than that of furfural for oil thereby forming a phase predominantly oil and a phase predominantly solvent, and separating the oil phase from the solvent phase.

4. The process of refining mineral oils, which comprises extracting the oil with a selective extraction solvent, forming a raffinate phase and an extract phase, each of which contains selective extraction solvent, separating the phases, effecting contact between one phase and a low-boiling aliphatic ketone characterized by its substantially complete miscibility with the selective extraction solvent and its lower solvent power for oil than that of the selective extraction solvent for oil thereby forming a phase predominantly oil and a phase predominantly solvent, and separating the oil phase from the solvent phase.

5. The process of refining mineral oils which comprises extracting the oil with a selective extraction solvent forming a raffinate phase and an extract phase each of which contains selective extraction solvent, separating the phases, effecting contact between one phase and a low boiling alcohol thereby forming a phase predominantly oil and a phase predominantly solvent, and separating the oil phase from the solvent phase.

SEYMOUR W. FERRIS.
EDWIN R. BIRKHIMER.